United States Patent [19]

Wonn et al.

[11] Patent Number: 4,586,077

[45] Date of Patent: Apr. 29, 1986

[54] SWITCHED SURFACE ACOUSTIC WAVE APPARATUS FOR CONTROLLING CABLE TELEVISION SERVICES

[75] Inventors: James W. Wonn, Hempfield Township, Mercer County; Bruce R. McAvoy, Pittsburgh, both of Pa.

[73] Assignee: Westinghouse Electric Corp., Pittsburgh, Pa.

[21] Appl. No.: 618,009

[22] Filed: Jun. 6, 1984

[51] Int. Cl.⁴ .................. H04N 7/10; H04N 7/16; H03H 9/72

[52] U.S. Cl. .................... 358/86; 358/114; 455/4; 333/193

[58] Field of Search ............ 358/86, 114; 455/4; 333/193, 195, 196

[56] References Cited

U.S. PATENT DOCUMENTS

| | | | |
|---|---|---|---|
| 3,831,116 | 8/1974 | Davis, Jr. et al. | 333/193 |
| 3,836,876 | 9/1974 | Marshall et al. | 333/195 X |
| 3,855,556 | 12/1974 | Hartmann | 333/193 |
| 3,858,118 | 12/1974 | Daniel | 333/193 X |
| 4,078,186 | 3/1978 | Folen et al. | 310/313 A |
| 4,152,679 | 5/1979 | Chen | 333/150 |
| 4,451,805 | 5/1984 | Ono et al. | 333/196 X |
| 4,461,032 | 7/1984 | Skerlos | 358/86 X |

FOREIGN PATENT DOCUMENTS 904198  2/1982  U.S.S.R. .............. 333/196

OTHER PUBLICATIONS

Yoshida et al., "Frequency Dependence of the Interaction Between SAW and Ni Films", 1982 Ultrasonics Symposium, IEEE, pp. 1036–1039.

McAvoy et al., "Strain and Temperature Dependence of the Interaction Between SAW and Ni Films on LiNbO₃", 1983 Ultrasonics Symposium, IEEE, pp. 1096–1099.

Primary Examiner—Keith E. George
Attorney, Agent, or Firm—Michael P. Lynch; Thomas R. Trempus

[57] ABSTRACT

A multichannel surface acoustic wave device is employed to respond to remote channel actuation signals to control the cable television program signals delivered to a subscriber premise.

7 Claims, 5 Drawing Figures

RELATIVE ATTENUATION OF A 10% Fe, 90% Ni FILM, 600 Å THICK AT 700 MHz

SWITCHED SURFACE ACOUSTIC WAVE APPARATUS FOR CONTROLLING CABLE TELEVISION SERVICES

BACKGROUND OF THE INVENTION

Community cable television systems typically offer a variety of services including a group of channels identified as basic service, and one or more pay services such as movie channels, sports channels, business and financial channels, each assigned to a specific channel with a separate monthly service charge so as to enable a subscriber to select from among the various cable services and thereby establish a monthly billing corresponding to the sum of the individual cable service charges. The present technique employed to authorize the subscriber selected services for viewing is controlled by the cable system operator through a television set-top converter located within the premises of the subscriber. Integrity and security of the set-top converter can be readily compromised by subscriber tampering with the set-top converter in efforts to secure unauthorized cable television services. It is thus an objective of the cable television industry to remove the cable service function from the subscriber's premises to an intermediate point between the source of cable television services and the individual subscriber's premises. The utility pole or underground interconnect associated with each subscriber's premises represents a particularly attractive location for a remote cable television service authorization control unit.

The principal advantage to the remote control approach is that it delivers to the subscriber's premises only those authorized and paid for cable television services. This is in contrast to the conventional set-top converter approach whereby all available cable television services enter the subscriber's premises and the selective authorization process is implemented in the set-top converter.

Unfortunately, the current approaches for transferring the authorization process from the subscriber's premises to strand-mounted equipment located on a utility pole or within an underground conduit rely on the use of electronic switching techniques which are very expensive and complex. Each channel of cable television service requires numerous components and the implementation of the multi-channel authorization process often reduces the overall effectiveness of the authorization control process.

SUMMARY OF THE INVENTION

There is described herein with reference to the accompanying drawings a reliable, simplified technique for implementing a remote subscriber control unit employing a surface acoustic wave device responsive to signals emanating from a central cable system location to selectively authorize cable service to a subscriber's premises. In a simplified implementation of the invention, a surface acoustic wave device is assigned to each subscriber's premises and mounted at a location remote from the premises, such as the utility pole supporting the cable service strand. The surface acoustic wave device accommodates a plurality of input signals, each signal corresponding to a separate cable service. The central cable system transmits control signals to the surface acoustic wave device to develop output signals from the surface acoustic wave device to the subscriber's premises which correspond to the subscriber's selected cable service package. The surface acoustic wave device for each subscribr is small in size and employs very few components thus enabling numerous devices to be packaged in a single control unit remotely mounted on a utility pole or underground cable service conduit.

BRIEF DESCRIPTION OF THE DRAWINGS

The invention will become more readily apparent from the following exemplary description in connection with the accompanying drawings.

DESCRIPTION OF THE PREFERRED EMBODIMENT

Figure 1:
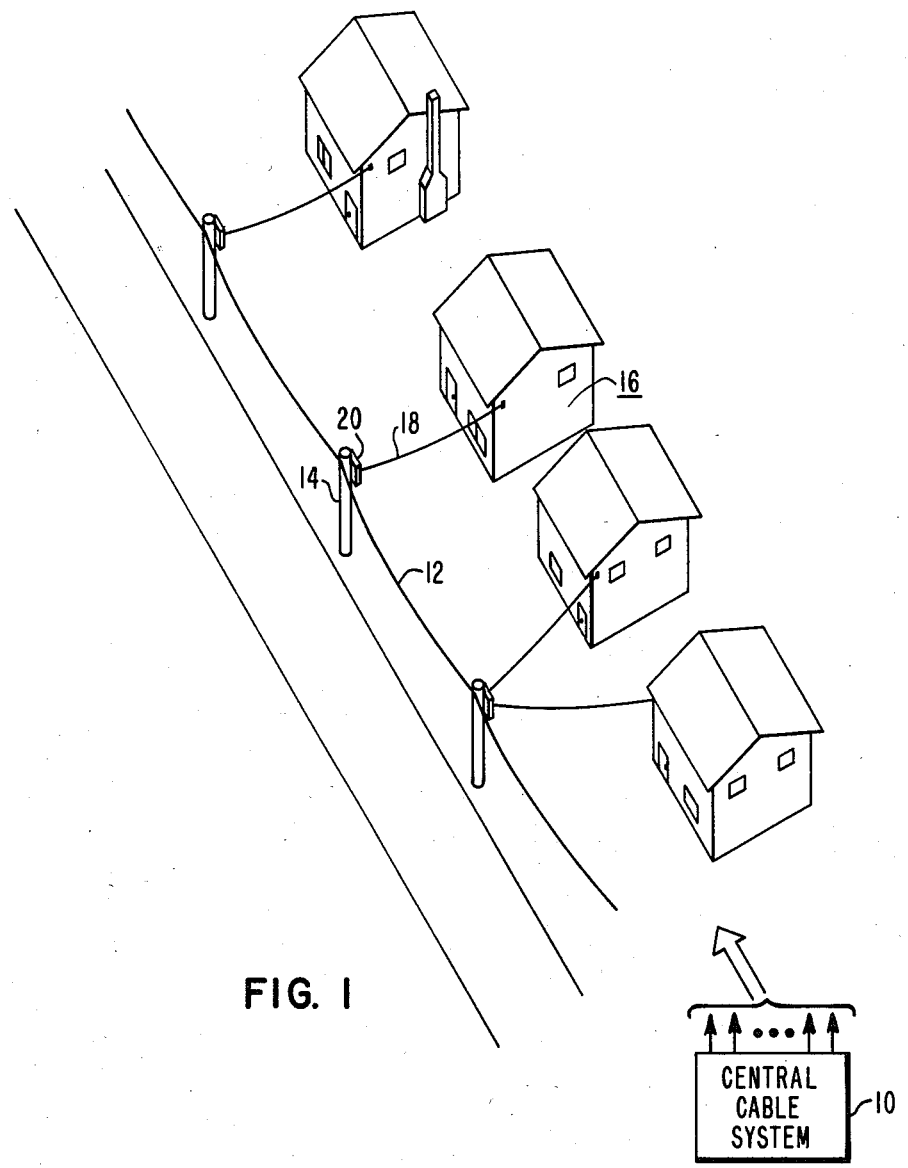
FIG. 1 is a schematic illustration of a residential cable television installation employing the invention.

Referring to FIG. 1 there is illustrated a typical residential cable television system installation wherein cable system programming is provided from a central cable system 10 via a cable 12 supported by utility poles 14 adjacent to residential dwellings or subscriber premises 16. The cable service signals are supplied to the subscriber premises 16 by cables 18 extending from a utility pole interconnect box 20 and the subscriber premises 16. It is readily apparent that the central service cable 12 can be buried underground in a suitable conduit and similarly the interconnect cable 18 located underground in conduit terminating at the subscriber's premises 16. Likewise, the subscriber premises 16, which has been typically illustrated as a private residential dwelling, may be a multifamily unit, a commercial office complex, a government or industrial site, etc.

The cable services provided by the central cable system 10 may consist simply of a grouping of basic commercial television channels, or it may further include separate pay services such as movie channels, sports channels, business information data transmission channels, etc. assigned to discrete subscriber channels for which an independent fee is collected on a monthly basis. While most subscribers are required to contract for the basic cable channel service, the individual pay channels associated with the additional subscriber services are optional.

As discussed above, it is highly desirable to control the number of cable channel services provided to a subscriber's premises from a location remote from the premises itself. This avoids unauthorized tampering with the cable service and facilitates cable service maintenance.

Figure 2:
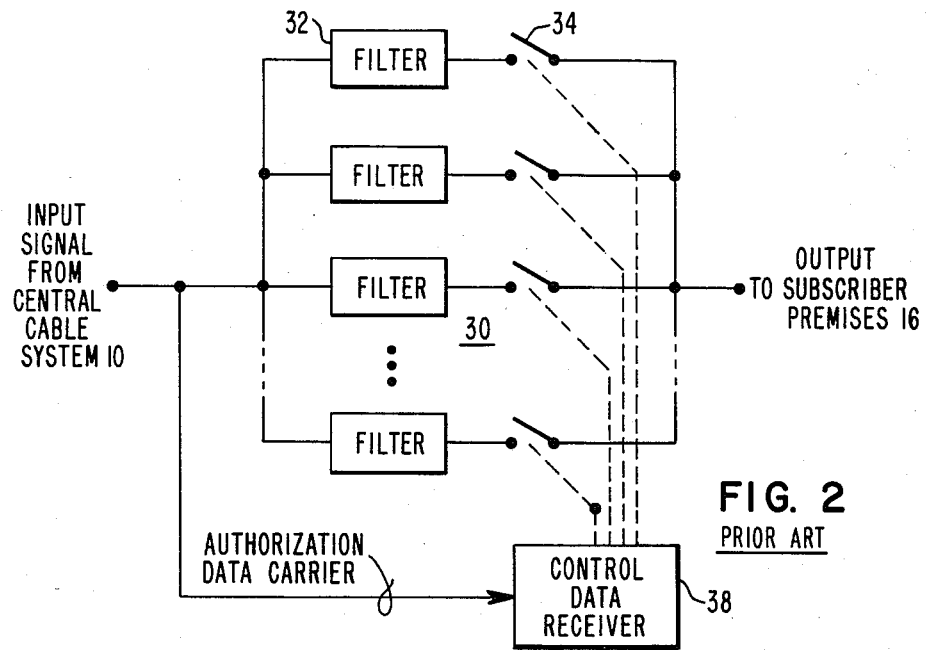
FIG. 2 is an electrical schematic illustration of an electronic embodiment of a remote cable service switching configuration.

The schematic embodiment of a remote subscriber service control unit employing electronic components and circuitry is typically illustrated in FIG. 2. While the technology and components are presently available to implement an electronic embodiment of a remote subscriber service control unit, the cost, number of components and complexity of such an approach makes it commercially unattractive. The electronic implementation of FIG. 2 suggests a multichannel electronic circuit 30. The number of channels corresponds to the number of channels of cable service transmitted by the central cable system 10 via the cable 12 which serves as an input to the circuit 30. Each channel of the circuit 30 includes a band-pass filter 32 to separate the central cable system input signal into conventional 6 mHz channels. An electronic switch 34 located in each cable channel of the circuit 30 is controlled by signals transmitted from the central cable system 10 to determine the specific band-pass output filter signals which are to be transmitted as the output signal of the circuit 30 to constitute the subscriber service signal supplied to the subscriber's premises 16. The control data receiver 38 responds to unique authorization data from the central cable system 10 for each subscriber's premises by actuating the appropriate switches 34 to permit the transmission of the subscriber selected cable service channels to the subscriber premises 16. The switches 34 are individually controlled by the receiver circuit 38 and provide the desired control over services delivered to the subscriber. One of the major obstacles to practical implementation of the electronic embodiment of FIG. 2 is the switch 34. An acceptable video switch generally requires an active device such as a field effect transistor wherein the gain is a function of a DC control voltage. Practical designs of this electronic switching requirement at cable television frequencies are not readily achievable without a significant number of electronic parts which require significant printed circuit board area.

Figure 3:
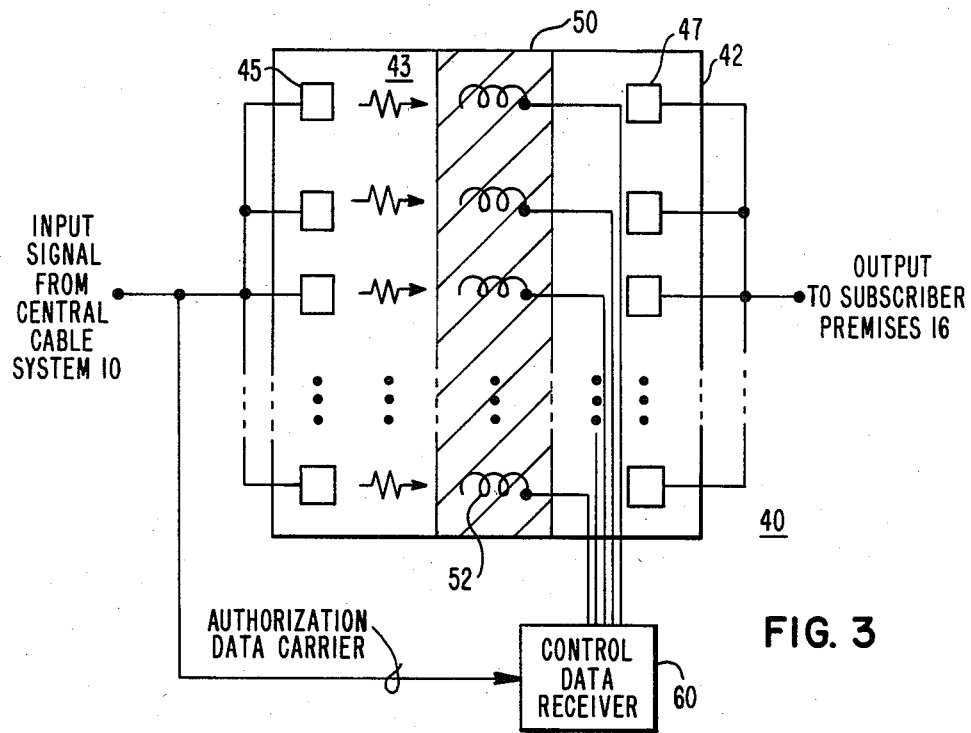
FIG. 3 is a schematic illustration of a novel embodiment of a surface acoustic wave device providing remote control of cable service to subscriber premises.

The implementation of the subscriber service control unit can be realized in a more economical and efficient manner by substituting a surface acoustic wave device, as shown schematically in FIG. 3, for the more complex electronic embodiment of FIG. 2. The simplicity and minimal size of a subscriber service control unit employing a surface acoustic wave device makes this approach extremely practical and commercially attractive.

The surface acoustic wave device 40 of FIG. 3 includes a thin substrate, i.e., between 50 and 100 mils, of piezoelectric material 42 supporting a plurality of transmission channels 43, each comprising a surface acoustic wave transmitting transducer 45 and a spaced-apart receiving transducer 47. The input cable service signal from the central cable system 10 is supplied as an input signal to each of the transmitting transducers 45. Each transmitting transducer 45 of the respective transmission channels 43 is designed to select and transmit a predetermined band of TV signals corresponding to one of the cable service selections made available to the subscriber from the central cable system 10. Thus, the full spectrum of cable television electrical signals transmitted by the central cable system 10 are supplied to each of the transmitting transducers 45. The transmitting transducers 45 of the respective transmission channels 43 transform the predetermined electrical signals into surface acoustic waves on the thin piezoelectric substrate 42. Each transmitting transducer 45 launches its particular band of frequencies toward the spaced-apart receiving transducer 47. The transducers are commercially available from sources including Andersen Laboratories, Bloomfield, Conn. and RF Monolithics, Inc., Dallas, Tex. The operation of the conventional transducers is described in the publication "Surface Wave Filters" by Herbert Matthews, published in 1977 by J. Wiley and Sons, New York.

Intermediate the transmitting transducers 45 and the receiving transducers 47 of each transmission channel 43 is a signal switching zone consisting of a thin film metallic coating 50 disposed on the surface of the piezoelectric substrate 42, the thickness of the coating 50 being between approximately 200 and 600 Angstroms. Coil elements 52 disposed above the portion of the thin metallic film 50 intermediate the transmitting and receiving transducers of the respective transmission channels 43 respond to direct current signals from the control data receiver circuit 60 by controlling, via magnetic fields, the transmission of acoustic waves between the respective combinations of transmitting and receiving transducers. When a magnetic field created by a coil element 52 responds to a DC current from the control data receiver circuit 60, the acoustic waves are not permitted to pass through the switching zone defined by the thin metallic film and thus are not available to the receiving transducer 47. In the absence of a magnetic field, the acoustic waves developed by a transmitting transducer 45 are received by the corresponding receiving transducer 47. Thus, the positioning of individual coil elements 52 in proximity to the thin metallic film 50 relative to each transmission channel 43 provides control over the signal transmission of each of the transmission channels 43. The electrical outputs of the receiving transducers 47 are combined to provide the cable system service contracted for by the subscriber. This multichannel cable service signal is then supplied from the remote subscriber service control unit, as represented by the device 40, to the subscriber premises 16. As discussed above, the control data receiver circuit 60 responds to subscriber cable service information from the control cable system 10 by selecting the appropriate cable services to be provided to the subscriber through the selective activation of the coil elements 52. Thus, simple DC control voltages are used to effect the switching of UHF and VHF signals over individual channel bandwidths typically in a range between 6 mHz and 24 mHz.

The technology of surface acoustic wave devices is such that a very large number of individually controlled channels, or acoustic paths, can be deposited on a single piezoelectric substrate. The dimensions of such a device for controlling ten channels of subscriber cable television service would be on the order of 1.5 cm $\times$ 1.5 cm. The number of controlled channels could be doubled by adding one additional surface acoustic wave device in parallel with the first. The thin metallic film 52 is selected to exhibit preferred switching properties at the frequency of acoustic wave transmission of the transmitting transducers 45. Thus, the thin film 52 should exhibit preferred switching characteristics in a frequency range of between 100 and 400 mHz in order to service pay TV channels currently in use.

Nickel has demonstrated good switching properties. The interaction of a nickel film with surface acoustic wave guides is described in detail in the following publications which are incorporated herein by reference.

(1) H. Yoshida, M. Levy, B. McAvoy and H. Salvo,Jr., "Frequency Dependence of the Interaction Between SAW and Ni Films," 1982 Ultrasonics Symposium Proceedings, IEEE Cat. No. 82 CH 1823-4, pgs. 1036 to 1039.

(2) B. McAvoy, H. Salvo, Jr., R. Wiegert and M. Levy, "Strain and Temperature Dependence of the Interaction Between SAW and Ni Films on LiNbO$_3$," 1983 Ultrasonics Symposium Proceedings, IEEE Cat. No. 83 CH 1947-1, pgs. 1096 to 1099.

Figure 4:
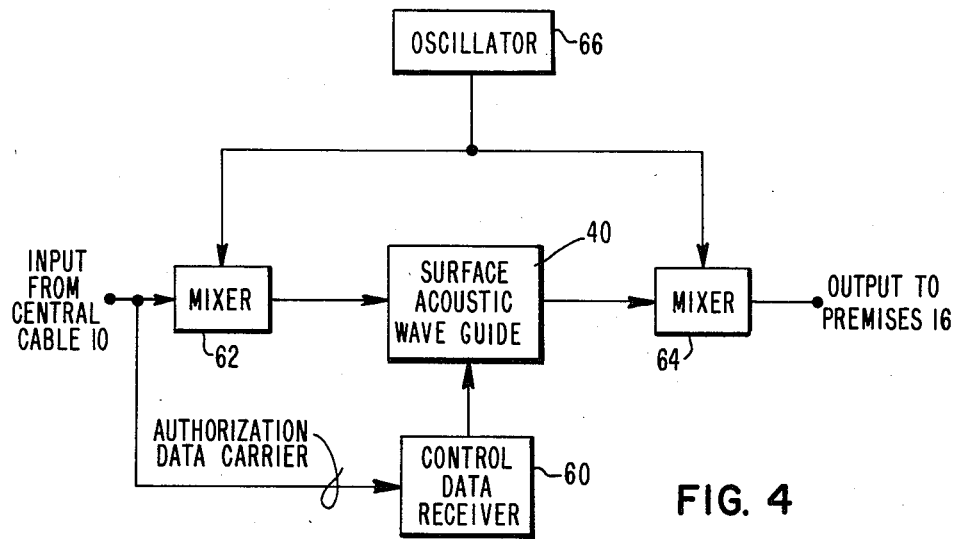
FIG. 4 is an alternate embodiment of a remote cable service switching system employing the surface acoustic wave device of FIG. 3.

If a film material exhibits preferred switching properties at frequencies higher than that associated with cable television signals, the use of the surface acoustic wave device 40 of FIG. 3 would require, for example, the circuit modification as illustrated in FIG. 4. Through the process of mixing, or heterodyning, an input mixer 62 translates the cable television system signal frequency band up to the optimum band for the surface acoustic wave device 40 employing a thin film coating 52. An output mixer 64 translates the composite output signal of the surface acoustic wave device 40 back down to the cable television frequency band. Since the up/down frequency conversion effected by the mixers 62 and 64 is the same, a single local oscillator 66 can be used for both mixer circuits.

If the insertion loss of the film materials employed to implement the switching zone 50 of the surface acoustic wave device 40 is sufficiently high as to require some pre-device gain, a gain block (not shown) would be included which would also serve to impedance match all of the transmitting transducers 45 connected in parallel on the piezoelectric substrate 42. Furthermore, a second gain block (not shown) would be required to match the output impedance of the receiving transducers 47 to the impedance of the cable connecting the surface acoustic wave device 40 to the subscriber premises 16.

Figure 5:
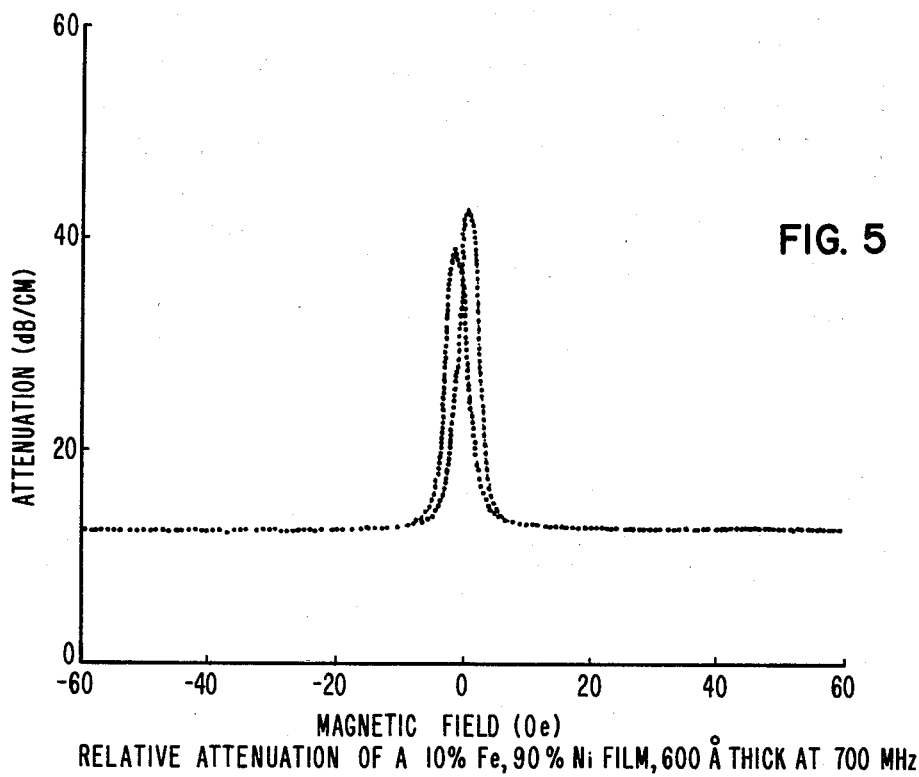
FIG. 5 is a graphical illustration of the relative attenuation vs. magnetic field of a specific surface acoustic wave device at 700 mHz.

FIG. 5 illustrates the relative attenuation of a 600 Angstrom thick film of 10% iron and 90% nickel. The on/off magnetic field change is approximately 4 gauss when utilizing a 10-turn coil element 52 at 100 milliamps. Insertion loss of the device 40 at about 700 mHz and the 'on" state is approximately 14 dB. In the "off" state, namely when no applied magnetic field is present, the insertion loss of the device 40 is approximately 44 dB/cm of acoustic path of the channels 43. Extending the path length of the channels 43 does not alter the "on" state insertion loss.

The size of the coil wire matrix of the coil elements 52 can be on the order of a few millimeters. The resulting magnetic field (H) produced in air is expressed by:

$$H = Ni = B/A$$

where N is the number of turns, i is the coil current in amperes, B is the magnetic flux, and A is the coil area.

The coil elements 52 are typically long and thin, e.g., several millimeters wide and a centimeter long, and are located close to the thin film switching zone 50. The coil elements can be replaced by magnetic field generators similar to a magnetic recording head, or a woven wire matrix.

We claim:

1. Apparatus for selectively switching one or more signals of a multisignal input as output signals, comprising:
   a source for generating a multisignal transmission,
   a signal selector means having said multisignal transmission as an input, and an output,
   said signal selector means including a multichannel surface acoustic wave guide means having a piezoelectric substrate, each channel including spaced-apart surface acoustic wave transmitting and receiving transducers affixed thereto and a metallic film disposed on the surface of said piezoelectric substrate intermediate said transmitting and receiving transducers, and magnetic field generators operatively coupled to the thin film associated with each of said channels, said transducers being responsive to a predetermined signal of said multisignal transmission,
   said film and field generator serving as switch means associated with each of said channels intermediate said transmitting and receiving transducers to selectively permit transmission of a predetermined signal from said transmitting to said receiving transducer, and
   control means operatively connected to said magnetic field generators for selectively activating the switch means of the respective channels to select predetermined signals of said multisignal transmission for transmission between the respective transmitting and receiving transducers, the output signals of said receiving transducers being the output of said signal selector means wherein said magnetic field generators are coil elements, said control means selectively supplying current signals to said coil elements to control the acoustic wave transmission between said transmitting and receiving transducers of the respective channels via magnetic fields.

2. Apparatus as claimed in claim 1 wherein said multisignal transmission includes switching information supplied to said control means for selectively determining the transmission state of said channels.

3. Apparatus for selectively providing one or more cable television signals, or groups of signals, to one or more cable television subscriber premises, comprising:
   a multichannel surface acoustic wave guide means including a piezoelectric substrate having as an input a multisignal cable television transmission, and an output, each channel including spaced-apart surface acoustic wave transmitting and receiving transducers affixed to said substrate, said transducers being responsive to a predetermined electrical signal of said cable television transmission, said transmitting transducers converting said electrical signal into an acoustic wave signal for transmission to said spaced-apart receiving transducer, said receiving transducer converting said acoustic wave signal to said electrical signal,
   switch means intermediate the transmitting and receiving transducers of the respective channels to provide on-off control of transmissions between the transmitting and receiving transducers of the corresponding channel, the outputs of the receiving transducers comprising the cable television signals available to the subscriber premises as the output of the multichannel surface acoustic wave guide means said switch means including a metallic film disposed on the surface of said piezoelectric substrate intermediate said transmitting and receiving transducers and magnetic field generators operatively coupled to the metallic film associated with each of said channels, said magnetic field generators including coil elements responsive to selectively supplied current signals in order to control the acoustic wave transmission between the transmitting and receiving transducers of the respective channels via magnetic fields.

4. Apparatus as claimed in claim 3 further including central cable system means for generating said multisignal cable television transmission and channel selector signals, and control means for controlling said switch means in response to said channel selector signals.

5. Apparatus as claimed in claim 3 wherein said piezoelectric substrate is of a thickness of between approximately 50 and 100 mils.

6. Apparatus as claimed in claim 3 wherein said metallic film is of a thickness of between approximately 200 and 600 Angstroms.

7. Apparatus as claimed in claim 3 wherein said metallic film is comprised substantially of nickel.

* * * * *